United States Patent [19]
Knepprath et al.

[11] Patent Number: 5,947,102
[45] Date of Patent: Sep. 7, 1999

[54] METHOD FOR CUTTING WAFERS FROM A CRYSTAL

[75] Inventors: Vernon Knepprath, Damascus, Oreg.; Walter Frank, Burgkirchen/Alz; Maximilian Kaeser, Mehring-Öd, both of Germany; Albert Pemwieser, Ach, Austria

[73] Assignee: Wacker Siltronic Gesellschaft für Halbleitermaterialien AG, Burghausen, Germany

[21] Appl. No.: 08/909,583

[22] Filed: Aug. 12, 1997

[30] Foreign Application Priority Data

Oct. 17, 1996 [DE] Germany .................... 196 42 908

[51] Int. Cl.⁶ ...................................................... B28D 1/08
[52] U.S. Cl. ........................ 125/12; 125/16.02; 125/21
[58] Field of Search .................... 51/307, 308; 83/651.1; 125/16.01, 16.02, 21, 12

[56] References Cited

U.S. PATENT DOCUMENTS

| | | |
|---|---|---|
| 2,980,524 | 4/1961 | Morton . |
| 3,817,727 | 6/1974 | Yancey . |
| 3,831,576 | 8/1974 | Mech ........................................ 125/12 |
| 4,440,745 | 4/1984 | Schmidt et al. . |
| 4,544,377 | 10/1985 | Schwen . |
| 4,853,140 | 8/1989 | Payne et al. . |
| 5,695,384 | 12/1997 | Beratan ...................................... 451/28 |
| 5,817,711 | 10/1998 | Kambe et al. . |

FOREIGN PATENT DOCUMENTS

| | | |
|---|---|---|
| 0733429 | 9/1990 | European Pat. Off. . |
| 0686684 | 12/1995 | European Pat. Off. . |
| 4218554 | 3/1992 | Japan . |

OTHER PUBLICATIONS

Derwent Abstract corresponding to EP 0 686 684 (#56–021505).

Derwent Abstract corresponding to JP 04218537 (#52–312572).

Database WPI, Section Ch, Week 9238, Derwent Publications Ltd., London, GB Class A97, AN 92–312512 XP0020508G1 & JP 04 218 594 A (Nippon Steel).

Patent Abstracts of Japan vol. 006, No. 090 (C–104) & JP 57021495 A (Mitshubishi Metal Corp).

Derwent Abstract (96–021905) corresponding to EP 0 686 684 A1.

Derwent Abstract (96–426856) corresponding to EP 0 733 429 A1.

*Primary Examiner*—Timothy V. Eley
*Attorney, Agent, or Firm*—Collard & Roe, P.C.

[57] ABSTRACT

A sawing suspension composition is composed of an essentially nonaqueous or anhydrous organic liquid in which hard-material particles are dispersed. The liquid is selected from a group of compounds which comprises low molecular weight polyglycols and any desired mixture of these polyglycols. The sawing suspension is used in conjunction with a wire saw for cutting wafers from a crystal of a brittle and hard material.

7 Claims, No Drawings

METHOD FOR CUTTING WAFERS FROM A CRYSTAL

BACKGROUND OF THE INVENTION

1. Field of the Invention

The present invention relates to a sawing suspension which is composed of an essentially anhydrous or nonaqueous organic liquid in which hard-material particles are dispersed. The sawing suspension is used in conjunction with a wire saw for cutting wafers from a crystal of brittle and hard material.

2. The Prior Art

Wire saws are used, for example, in order to divide silicon crystals into thin wafers. A sawing suspension, referred to as a slurry, which is transported from the saw wires to the crystal is used in this process as an agent with abrasive action. The sawing suspension is composed of hard-material particles which are dispersed in a liquid. Sawing suspensions with an oil base and with an aqueous base are already known.

From EP-686 684 A1 it is disclosed that it is disadvantageous to use an oil as a liquid for the sawing suspension. The reason for this is that the cleaning of oil-contaminated parts of the wire saw and the cleaning of the wafers are very expensive. A sawing suspension which has an aqueous base and which contains water-soluble polymers is therefore proposed.

According to JP-4,218,594, if an aqueous sawing suspension is used which contains certain glycols and thickening agents, the extent of the superficial damage to the wafers caused by the cutting operation is reduced.

U.S. Pat. No. 4,853,140 describes how the choice of an aqueous cooling lubricant favorably influences the shape (geometry) of silicon wafers. This occurs if the silicon wafers are cut from a crystal with a sawblade while using this cooling lubricant.

If a wire saw is used as the sawing tool, care also has to be taken to provide that the cut wafers have lateral surfaces which are as flat as possible. These lateral surfaces, in addition, should also be parallel to one another. Deviations from this ideal shape are typically quantified by measuring the thickness variation (TTV value) and the sag (warp value) of a wafer.

SUMMARY OF THE INVENTION

The present invention is based on the discovery that, if known sawing suspensions are used, then
  wafers are frequently obtained whose geometry is unsatisfactory,
  crusts are formed from hardened material and, consequently, contaminated wafers and contaminated wire saw parts can be cleaned only with difficulty, and
  the geometry of the wafers obtained sometimes deteriorates after repeated use of the sawing suspension.

It is therefore an object of the present invention to provide a sawing suspension during the use of which such disadvantageous phenomena do not occur.

The above object is achieved by the present invention which provides a sawing suspension which is composed of an essentially nonaqueous or anhydrous organic liquid in which hard-material substances are dispersed, and wherein the nonaqueous or anhydrous organic liquid is selected from the group of compounds which comprises low molecular weight polyglycols and any desired mixture of these low molecular weight polyglycols.

The present invention also provides a method in which this sawing suspension is utilized in conjunction with a wire saw for cutting wafers from a crystal of brittle and hard material.

The sawing suspension is particularly suitable for cutting wafers having large diameters of at least 150 mm. With regard to the geometry of the cut wafers, when the sawing suspension of the invention is used, a very positive result is achieved. This result is superior to the result which is achieved when sawing suspensions based on oil are used. Compared with prior art aqueous sawing suspensions, the sawing suspension of the invention permits longer periods of use. The formation of crust is considerably reduced. Residues of the sawing suspension can be removed with water without special effort. Furthermore, the sawing suspension is notable for good environmental compatibility since the liquid components of the invention are not toxic and are biodegradable.

It has been discovered that aqueous sawing suspensions are suitable for use only during comparatively short periods of time. This is because they rapidly lose water during their use and thus cause the hard-material particles to settle out. When sawing silicon crystals, this water loss is accelerated because chipped silicon from the crystals will split the water into hydrogen and oxygen with the development of heat. As a consequence, silicon dioxide, which incrusts hard-material particles settling with it, is also formed. In addition, troublesome foam formation occurs as a result of the gas formation. These circumstances ultimately have the effect that the geometry of the cut wafers no longer meets the requirements even after a comparatively short period of use of the aqueous sawing suspension.

The absence of water is therefore particularly important for a long term, successful use of the organic anhydrous or nonaqueous sawing suspension. However, a small amount of water of up to 5% by weight of water, based upon the total weight of the sawing suspension, can be tolerated. For example, the presence of water is tolerable if it is attributable to the hygroscopic nature of the liquid used to prepare the sawing suspension.

A nonaqueous or anhydrous liquid is used which is selected from a group of compounds which comprises low molecular weight polyglycols and any desired mixtures of these compounds. The viscosity of the liquid is preferably from 50 to 800 mPa.s at 20° C. The preferred molecular weight of the compounds is in the range from 75 to 150. Examples of preferred compounds are propylene glycol, dipropylene glycol, triethylene glycol and low molecular weight polyethylene glycols and mixtures of the these compounds. Particularly preferred is dipropylene glycol. The low molecular weight of these glycols provides water solubility for ease of cleaning these glycols from the wafers or from the wire saw by using water or aqueous cleaning solutions.

To prepare the sawing suspension, the hard-material particles are dispersed in the liquid. Preferably, the hard materials particles used are those described in EP-686,684 A1. A particularly preferred hard material particle is silicon carbide.

The sawing suspension may be replaced after a certain number of sawing operations. It is also possible to renew initially only a part of the sawing suspension at regular intervals.

It is furthermore preferred to work up a spent sawing suspension and to remove the hard material particles from the liquid. The hard material particles may optionally be reused. In disposing of the liquid, its biodegradability is an important property for improving its usability.

While several embodiments of the present invention have been shown and described, it is to be understood that many changes and modifications may be made thereunto without departing from the spirit and scope of the invention as defined in the appended claims.

What is claimed is:

1. A method for cutting wafers from a crystal of brittle and hard material comprising using a wire saw for cutting said crystal to produce said wafers and using a sawing suspension during said cutting, and said sawing suspension being composed of an essentially nonaqueous liquid in which hard-material particles are dispersed; and said nonaqueous liquid is a compound selected from the group consisting of a low molecular weight polyglycol and mixtures of low molecular weight polyglycols with the proviso that propylene glycol is excluded.

2. The method as claimed in claim 1, wherein the nonaqueous liquid is selected from the group consisting of dipropylene glycol, triethylene glycol, a low molecular weight polyethylene glycol and mixtures thereof.

3. The method of claim 2, wherein the nonaqueous liquid is triethylene glycol.

4. The method of claim 2, wherein the nonaqueous liquid is a low molecular weight polyethylene glycol.

5. The method as claimed in claim 2, wherein the nonaqueous liquid is a mixture of dipropylene glycol, triethylene glycol, and a low molecular weight polyethylene glycol.

6. The method of claim 1, wherein the nonaqueous liquid is anhydrous and organic, and has a viscosity of 50 to 800 mPas at 200° C.

7. The method of claim 2, wherein the nonaqueous liquid is dipropylene glycol.

* * * * *